Aug. 25, 1964     R. H. LAWRY     3,145,789
PILOT ROCK DRILL
Filed March 20, 1962
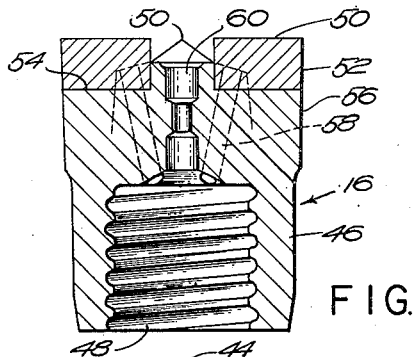
FIG. 2
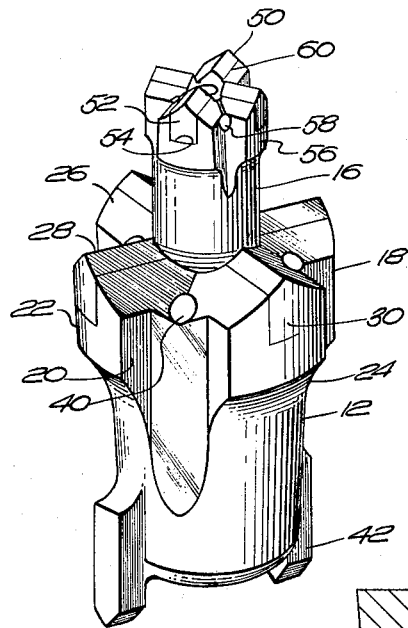
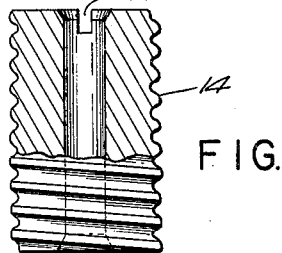
FIG. 3
FIG. 1
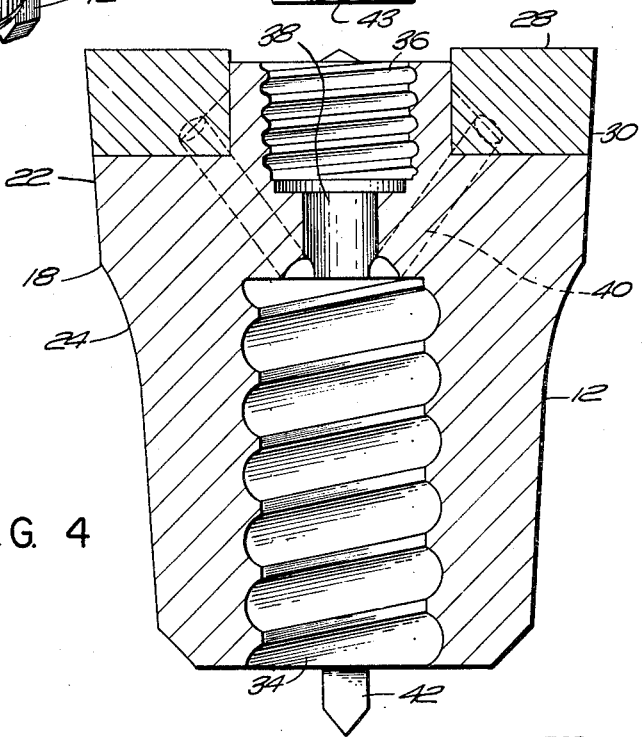
FIG. 4
*INVENTOR.*
RUSSELL H. LAWRY
BY Morse + Altman
ATTORNEYS United States Patent Office 3,145,789
Patented Aug. 25, 1964

3,145,789
PILOT ROCK DRILL
Russell H. Lawry, 321 Main St., Lynnfield Centre, Mass.
Filed Mar. 20, 1962, Ser. No. 180,964
1 Claim. (Cl. 175—386)

This invention relates in general to drilling devices and more particularly is directed towards improvements in drill bits for boring through earth, rock and other hard substances.

In earth and rock drilling operations one of the most persistent and annoying problems encountered is in keeping the drill moving in a true straight path. Frequently conventional drills will be deflected upon passing through an angular crevice, fault, slip line or fissure. This deflection causes a serious strain upon the drill and often results in actual breakage of the drill with consequent delays in the boring operation while the drill is withdrawn from the bore hole and a new head mounted on the drill shaft.

Such breakage and resulting delays are quite costly since the drills themselves are expensive and the entire crew must suspend boring operations until the necessary repairs are completed.

Accordingly, it is an object of the present invention to provide improvements in drill bits for boring through earth, rock, gravel and the like.

Another object of this invention is to provide a drill bit having an axially extending center bit that is readily replaceable.

Still another object of this invention is to provide a drill bit adapted to carry a replaceable center bit in any one of a variety of different sizes.

Yet another object of this invention is to increase the useful life of drill bits especially those used in rock and earth boring operations.

A still further object of this invention is to provide a rugged, durable, drill bit that is adapted to cut an axially straight bore through rock and other hard substances.

Still another object of this invention is to provide a drill bit that may cut in axially opposite directions.

More particularly, this invention features a drill head having a main body portion with cutting edges and a replaceable center bit extending coaxially from the body portion. The center bit is also provided with cutting edges and has a diameter less than that of the main body portion. The bit serves to drill a small bore in advance of the body portion to assist in an axially straight movement of the entire drill head. This invention also features the providing of cutting edges on the trailing portion of the drill head whereby rock and other material being lodged behind the head may be cut to facilitate withdrawal of the head from the bore hole. The invention also contemplates a novel arrangement of passageways for introducing air or liquid through the assembly for cooling and flushing purposes.

But these and other features of the invention, along with further objects and advantages thereof, will become more readily apparent from the following detailed description of a preferred embodiment of the invention, with reference being made to the accompanying drawings in which:

FIG. 1 is a view in perspective of a drill head made according to the invention, FIG. 2 is a sectional view in side elevation of the replaceable center bit shown in place in FIG. 1, FIG. 3 is a sectional view in side elevation of an annular nipple used to connect the center bit to the main body portion, and, FIG. 4 is a sectional view in side elevation of the main body portion of the drill head.

Referring now to the drawings FIG. 1 illustrates a drill head formed from a suitable material such as hardened steel or the like and includes a main body portion 12 (FIG. 4) a connecting nipple 14 (FIG. 3) and a replaceable center bit (FIG. 2).

The main body portion 12 has a generally cylindrical configuration with a plurality of shoulders 18 extending radially from its upper or leading section. Typically four shoulders are provided and may be arranged at 90° intervals or, as shown, an opposing pair of shoulders may define acute and obtuse supplementary angles with respect to another pair of opposing shoulders. In any event each shoulder has a generally block like shape with flat sides 20, an arcuate outer face 22, a streamlined trailing portion 24 and planar upper faces 26 which define a sharp leading cutting edge 28.

In a preferred embodiment of this invention the cutting edges are individual insert tips 30 formed from a particularly hard material such as a tungsten-carbide alloy or the like.

The tips may be mounted to the shoulders by seating them in radial channels formed in the leading portion of the shoulders. The tips may be made fast in position by brazing, welding or the like.

The body portion 12 is provided with a pair of cylindrical tapped sockets 34 and 36 which communicate with one another through an axial port 38. The socket 34 is located in the trailing end of the body portion and is adapted to connect the entire head assembly to a tubular drive shaft or drill steel as it is more commonly referred to in the art. The socket 36 is located in the leading end of the body portion and is normally somewhat smaller in diameter than the socket 34. The function of the socket 36 is to accommodate one end of the nipple 14 (FIG. 3) which in turn may be connected by threaded engagement with the center bit 16 (FIG. 2).

Referring again to FIG. 4 it will be noted that the main body portion 12 also includes a number of blowholes or passageways 40 each of which extends from the walls of the port 38 diagonally outward to the crotch at the junction (FIG. 1) of the planar faces 26 of adjacent shoulders 18. In practice air, water, or other fluids are pumped under pressure through the tubular drive shaft into the head assembly and out through the blowholes 40. The gas or liquid, whichever is used, keeps the cutting tool cool while at the same time keeps the bore hole clear of loose material by forcing it back out through the entrance of the bore hole.

As best seen in FIG. 1 a pair of cutting teeth 42 are formed integral with the body portion 12 and extend rearwardly from the shank. These teeth serve to cut through loose rocks or other material that may lodge behind the drill head and hinder its withdrawal from the bore hole.

The nipple 14 shown in FIG. 3 is formed with an axial passage 43 to accommodate a flow of air or liquid to the center bit 16. A slot 44 bisects one end of the nipple so that a suitable tool may be inserted to tighten the nipple into the socket 36 or remove it for servicing.

Referring now more particularly to FIG. 2, the center bit 16 has a construction generally similar to that of the main body portion 12 but on a smaller scale. The bit has a cylindrical shank 46 with a tapped axial socket 48 provided to accommodate the slotted end of the nipple 14 for assembling the bit to the main body portion 12. It will be noted that all of the threads in the sockets 34, 36, and 48 and on the nipple 14 are left-handed so as to prevent loosening or disconnection of the several parts by driving rotation of the head in a direction opposite to that of the threading.

The bit 16 includes a plurality of radial cutting teeth 50 with four being illustrated. These teeth are formed at the leading end of the bit and are arranged at 90° intervals. Preferably the teeth 50 are cut from insert tips 52 of a particularly hard metal such as tungsten-carbide or the like. The tips are firmly seated in channels 54 formed in a like number of radial shoulders 56 which are integral with the bit.

A plurality of blowholes 58 are formed radially within the bit and extend between an axial passage 60 and the exterior of the bit at the junctures of adjacent shoulders 56.

The drilling device described herein enjoys inherently long periods of operational utility by reason of the insert tips of hard metal alloys. The cutting teeth may be used over extended periods of continuous or intermittent operation without the need of sharpening or replacing the drill head. The removable center bit 16, it will be understood, by reason of its reduced diameter will work its way through rock in a straight line more easily than the relatively wide, massive body portion 12. The smaller bit 16 is thus able to broach through cracks and fissures without deflecting to any appreciable extent. It will also be appreciated that with the smaller bit preceding the larger bit an open area will be made in the center of the bore thereby relieving the larger bit of a considerable amount of pressure as it cuts through the rock, earth, etc. Furthermore, the bit 16 is securely mounted to the body portion and cannot be accidentally loosened while at the same time it will be appreciated that it may be readily uncoupled when desired.

The connecting arrangement between the several parts permits quick substitution between center bits and main body portions. Also, the connection allows for mounting center bits of various lengths, diameter and designs depending upon the character of the material that is to be bored. It will also be appreciated that the entire head assembly may be operated at cool efficient temperatures by reason of the blowholes that are formed in both the body portion and the removable bit.

While the invention has been described with particular reference to the illustrated embodiment, it will be understood that numerous modifications thereto will appear to those skilled in the art. For example, the cutting edges of the bits may be chisel shaped, if desired, and the particular number of cutting edges may be increased or decreased from the form shown on each bit. Also the orientation of the cutting edges may be altered from the illustrated arrangement. As a further modification the nipple may be omitted and the smaller bit provided with an integral threaded shank section for attaching the bit 16 to the main body portion 12. Accordingly, the above description and accompanying drawings are intended to be taken as illustrative of the invention rather than in a limiting sense.

Having thus described my invention, what I claim and desire to obtain by Letters Patent of the United States is:

A drill head for use on the end of a tubular drive shaft, comprising a main body section having a tapped recess formed in the forward and rearward ends thereof, the rearward recess being adapted to accommodate the end of said drive shaft, said main body section being also formed with an axial passage communicating with both of said recesses, the forward end of said body section being formed with a plurality of radially extending cutting edges, said main body section being further formed with an array of internal passages communicating with said axial passage and the exterior of said main body section adjacent said cutting edges, the forward end of said main body section terminating in a flat annular surface surrounding the forward recess and substantially flush with said cutting edges, a bit having a tapped recess formed in the rearward end thereof and a passage communicating with said recess and the exterior of said bit, said bit being further formed with a plurality of radially extending cutting edges at the forward end thereof and a flat annular surface at the rearward end and a tubular nipple adapted to engage the forward recess of said body portion and the rearward recess of said bit to mount said bit to said body portion with their annular surfaces in face to face mating contact.

References Cited in the file of this patent
UNITED STATES PATENTS

| | | |
|---|---|---|
| 923,513 | Hardsocg | June 1, 1909 |
| 2,318,326 | Padley | May 4, 1943 |
| 2,818,292 | Graber | Dec. 31, 1957 |
| 2,821,364 | Godfrey | Jan. 28, 1958 |
| 2,884,227 | Hjalsten | Apr. 28, 1959 |
| 2,938,709 | Curtis | May 31, 1960 |